United States Patent [19]

Smoot

[11] Patent Number: 4,523,536
[45] Date of Patent: Jun. 18, 1985

[54] ENERGY EFFICIENT POWER DRIVEN MARINE VESSEL BOAT

[76] Inventor: Mark H. Smoot, 1900 E. Ocean Blvd., Apt. 1607, Long Beach, Calif. 90802

[21] Appl. No.: 510,000

[22] Filed: Jul. 1, 1983

[51] Int. Cl.³ ............................ B63B 1/34; B63B 1/38
[52] U.S. Cl. ................................. 114/67 R; 114/67 A; 114/290
[58] Field of Search ............. 114/67 R, 67 A, 288-290, 114/56, 61; 180/129; 244/23 R; 440/38, 47, 69

[56] References Cited

U.S. PATENT DOCUMENTS

| | | | |
|---|---|---|---|
| 3,137,261 | 6/1964 | Noe | 114/290 |
| 3,259,097 | 7/1966 | Van Veldhuizen et al. | 114/67 A |
| 3,405,526 | 10/1968 | Aschauer | 440/47 X |
| 3,473,503 | 10/1969 | Gunther | 114/67 A |
| 4,046,217 | 9/1977 | Magnuson | 114/67 R |

FOREIGN PATENT DOCUMENTS 1210973 11/1970 United Kingdom ............. 114/67 A

Primary Examiner—Sherman D. Basinger
Attorney, Agent, or Firm—William C. Babcock

[57] ABSTRACT

A water jet propelled boat that includes a source of pressurized air that by a single action control may be delivered to bow and stern portion positioned resilient bags to inflate the same to vary the contour of the wetted portion of the boat to a desired configuration. The boat includes a number of laterally spaced sponsons that have forward bottom surfaces that taper downwardly to merge into substantially straight rearward bottom surfaces on which the boat rides when traveling at high speed. Pressurized air is discharged from the source to flow rearwardly under the boat and impart a lift to the latter. The desired configuration of the bags is one which in combination with the action of the sponsons and the rearwardly flowing bubbles results in the boat moving through the water in a fuel efficient manner.

8 Claims, 12 Drawing Figures

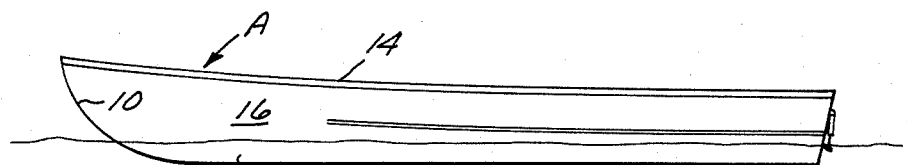
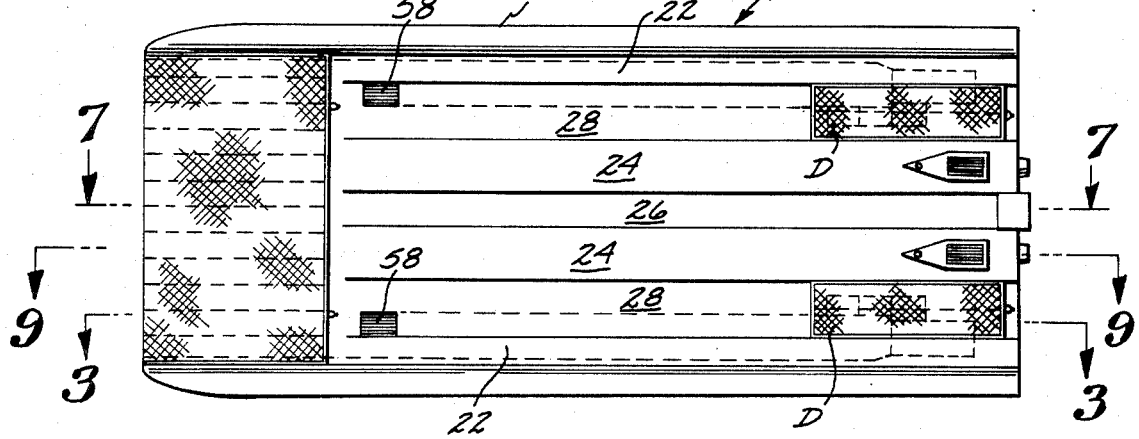
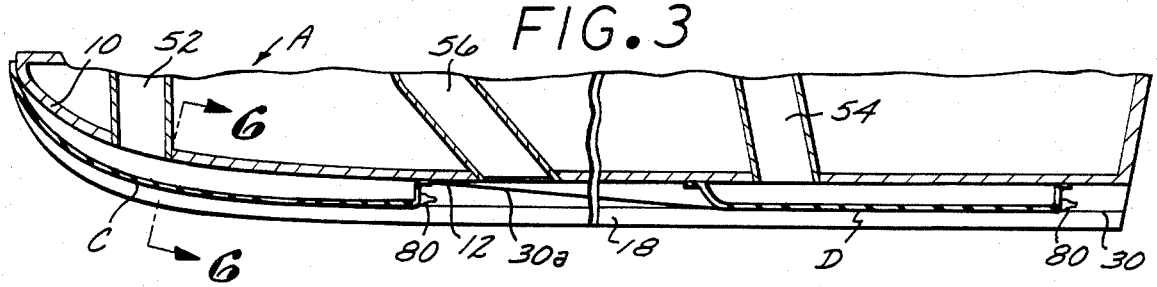
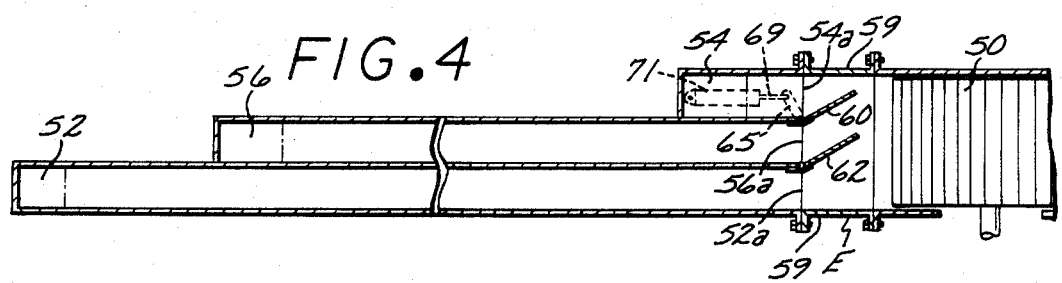
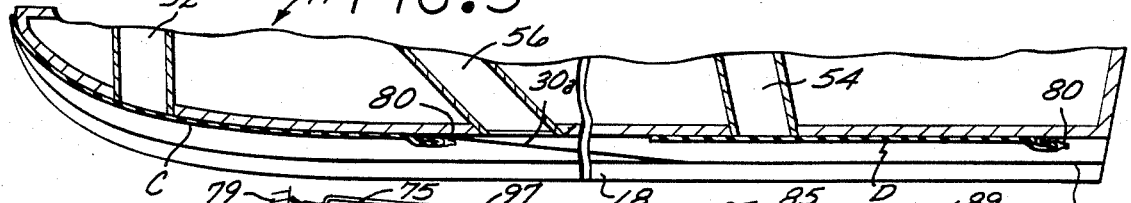

ENERGY EFFICIENT POWER DRIVEN MARINE VESSEL BOAT

DESCRIPTION OF THE PRIOR ART

In the past, both hydro lift and pressurized air lift have been utilized in reducing the drag of marine vessels in moving through water. The present invention employs both principals in a novel combination to reduce hull drag and high speed hull slamming, while improving the stability of the vessel, and appreciably reducing the horse power requirements and fuel consumption in moving the vessel through a body of water.

A major object of the present invention is to supply a substantially rectangular hull that has a pair of side keels extending the longitudinal length thereof, with a first inflatable bag being situated between the keels and overlying the bow, and a pair of second pliable bags that may be inflated are situated adjacent the stern of the vessel, and the bags when inflated varying the contour of the surface portion of the vessel to one that is particularly adapted for the speed at which the vessel is operated, with these bags in combination with a number of laterally spaced, longitudinally extending sponsons that extend downwardly from the bottom of the boat, and the injection of pressurized air downwardly through the center forward portion of the hull to flow rearwardly therebelow, all cooperating to provide a vessel that moves through the water at high speed with a minimum of frictional resistance and in a fuel effecient manner.

SUMMARY OF THE INVENTION

A power driven marine vessel, preferably in the form of a jet propelled boat, that may have the contour thereof selectively varied to lessen the hydrodynamic drag thereon as the speed of the boat is increased relative to the body of water on which the vessel floats.

The boat includes a substantially rectangular hull that includes a deck, a downwardly and rearwardly curving bow that develops into a flat bottom, a pair of laterally spaced side walls that extend downwardly from the deck below the bottom to define a pair of longitudinally extending side keels. A pair of outwardly disposed sponsons extend downwardly from the bottom and are situated adjacent the side keels, and a pair of inwardly disposed sponsons are situated between the outer pair of sponsons. All of the sponsons are disposed rearwardly from the bow of the vessel and have lower surfaces that taper downwardly and rearwardly to develop into flat portions that are substantially parallel to the water when the vessel operates at high speed. The inner pair of sponsons define a central channel therebetween, and the inner and outer sponsons cooperate to define a pair of side channels that are situated on opposite sides of the central channel.

A first inflatable bag of a pliable sheet material extends downwardly and rearwardly over the bow of the boat, while a pair of second inflatable bags are situated in the rear portion of a pair of side channels. A pair of engines on the hull drive a pair of propellers to generate jets of water that force the hull forwardly. By varying the velocities of the jets relative to one another, and diverting direction of flow the boat may be steered. One or more power driven blowers are employed for producing pressurized air that is used in selectively inflating the first and second bags, as well as injecting air downwardly through openings in the bottom of the hull to flow rearwardly thereunder.

The flow of air to the first and second bags from the blower is controlled by valve means. When the vessel is operated at high speed the first and second bags are inflated to vary the configuration of the hull portion exposed to the water, with this new configuration being one that imparts a lift to the hull that tends to minimize the hydrodynamic drag on the vessel as it moves forwardly through the water. Additional lift is imparted to the vessel as it moves forwardly through the water at a relatively rapid speed due to the tapered configuration of the lower surfaces of the sponsons, and the additional lift imparted to the vessel by pressurized air being directed thereunder and flowing rearwardly through a central longitudinal channel under the hull to discharge at a desired rate from the stern portion of the vessel. This desired rate is achieved by varying the position of a pivotally supported elevator located at the rearward extremity of the central channel through which the pressurized air discharges rearwardly. The desired role will be one in which a minimum of the lower surface portion of the vessel is exposed to hydrodynamic drag.

BRIEF DESCRIPTION OF THE DRAWINGS

FIG. 1 is a side elevational view of the hull of the vessel;

FIG. 2 is a bottom plan view of the vessel;

FIG. 3 is a longitudinal cross sectional view of the vessel taken on the line 3—3 of FIG. 2;

FIG. 4 is a longitudinal cross sectional view of one of the duct systems and valves used in controlling the flow of pressurized air to the first and second inflatable bags;

FIG. 5 is a longitudinal cross sectional view of the hull taken on the same line as FIG. 3, but with the first and second bags shown in non-inflated positions and situated in abutting contact with the bottom portion of the hull structure;

FIG. 6 is a diagrammatic view of the single handle control system for varying the inflation of the resilient bags;

DESCRIPTION OF THE PREFERRED EMBODIMENT

Figure 7:
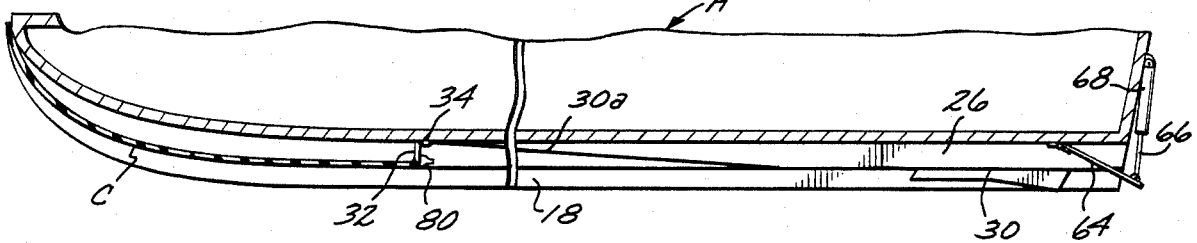
FIG. 7 is a longitudinal cross sectional view of the hull structure taken on the line 7—7 of FIG. 2, with the pivotally supported elevator situated on the rear of the hull being indicated in a downwardly depending position.
Figure 8:
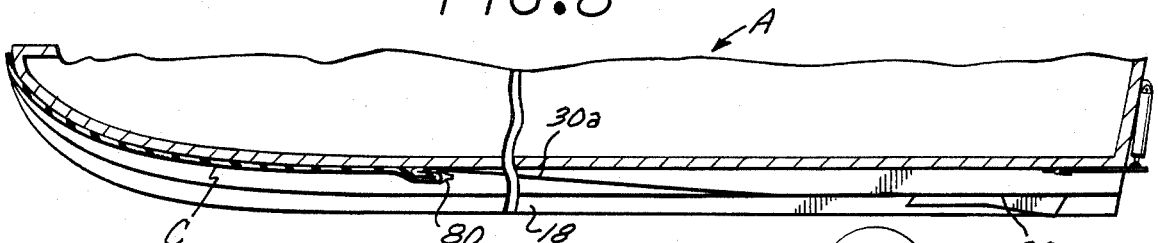
FIG. 8 is the same view as shown in FIG. 7 but with the first forwardly disposed bag non-inflated, and the elevator raised to an abutting position with the rearward portion of the hull.

The vessel A of the present invention as best seen in FIGS. 1, 2 and 3 includes a generally rectangular hull B. The hull B includes a downwardly and rearwardly curving bow 10 that develops into a flat bottom 12. The hull B has a deck 14 from which a pair of laterally spaced side walls 16 extend downwardly, and below the bottom 12 to define a pair of side keels 18. The hull B has a transom 20.

A pair of outer sponsons 22 are situated rearwardly of the bow 10 and project downwardly from the bottom 12. An inner pair of sponsons 24 also project downwardly from the bottom 12. The inner pair of sponsons 24 define a central longitudinally extending channel 26 therebetween. The pair of inner sponsons 24 and the pair of outer sponsons 22 define a pair of outer channels 28 therebetween.

Each of the sponsons 22 and 24 has a flat rear bottom surface 30 that is substantially parallel with the surface of the body of water over which the vessel A travels when the vessel is propelled at high speed. The forward bottom surfaces 30a of all of the sponsons 22 and 24 taper upwardly and forwardly to merge into the bottom 12.

A first inflatable bag C of a pliable sheet material extends downwardly and rearwardly over the bow 10 and is in abutting contact therewith when the first bag is not inflated. A pair of second inflatable bags D are located in the rear portions of the pair of outer channels 28.

The first inflatable bag C includes side walls 32 that develop into lips 34 that are adhered to the hull B as best seen in FIG. 7.

Figure 12:
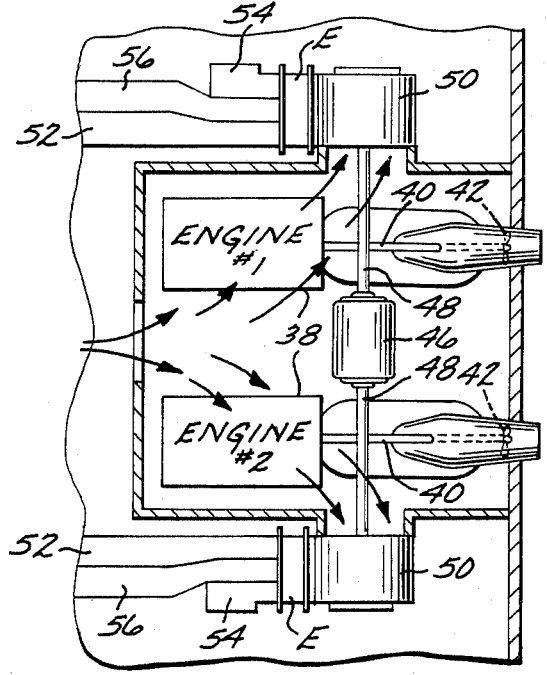
FIG. 12 is a diagrammatic view of the engine, duct structures and water jet producing assemblies.

The vessel A is illustrated in FIG. 12 as including a pair of engines 38, each of which has a drive shaft 40 extending rearwardly therefrom. Each of the drive shafts has a propeller 42 secured to the rearward extremity thereof.

Figure 10:
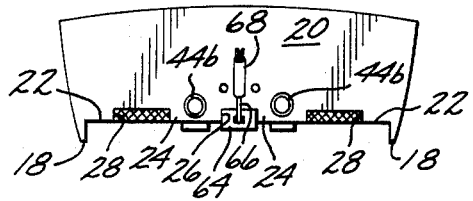
FIG. 10 is a rear elevational view of the hull structure.
Figure 11:
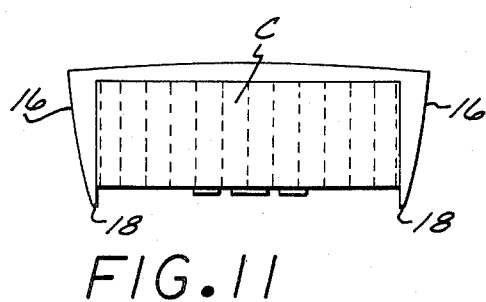
FIG. 11 is a forward side elevational view of the hull structure.

Two laterally spaced inverted L-shaped tubular housings 44 are located in the rearward portion of the hull B. Each of the housings 44 has a water intake poriton 44a that projects downwardly below bottom 12 through an opening in the latter. Each of the housings 44 has one of the propellers 42 therein with the propeller axially aligned with a rearwardly and inwardly tapering tubular discharge portion 44b of the housing, which portion extends rearwardly through the transom 20 as shown in FIGS. 10 and 12.

A motor 46 is illustrated in FIG. 12 that by dual drive shafts 48 operates a pair of blowers 50, each of which has the discharge thereof flowing into a valve box E from which first, second and third pressurized air conducting ducts 52, 54 and 56 extend.

Figure 9:
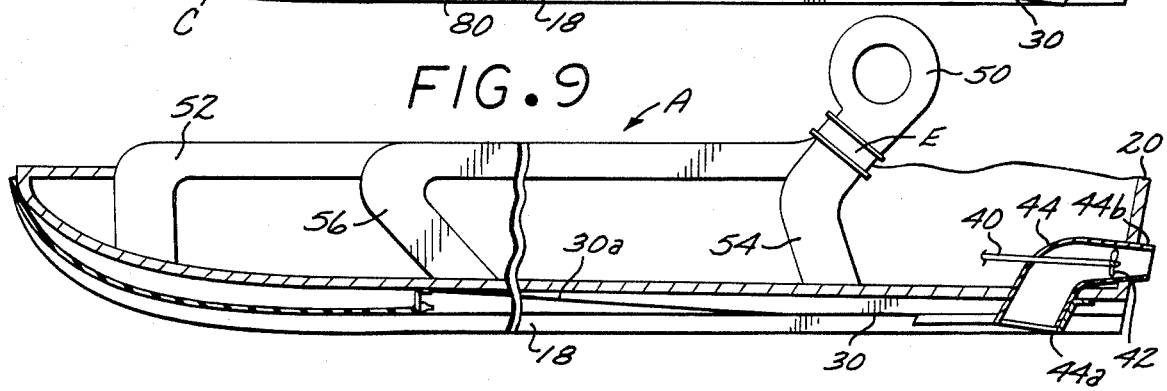
FIG. 9 is a combined side elevational and longitudinal cross sectional view of the hull structure taken on the line 9—9 of FIG. 2.

The first bag C is inflated by pressurized air flowing thereto through two first ducts 52, one of which is shown in FIG. 9. Each of the second bags D may be inflated by pressurized air flowing thereto through one of the second ducts 54. A third duct 56 supplies pressurized air to the forward portion of the central channel 26 through an opening 58 in the bottom 12 of hull B.

Each valve box E has the rearward inlets 52a, 54a and 56a of the first, second and third pressurized air ducts 52, 54 and 56 in communication with the interior thereof, with pressurized air being discharged into the interior at a substantially constant rate by blower 50. Each valve box E includes a pair of laterally spaced side walls 59 that pivotally support first and second shafts 61 and 63 therebetween. The first and second shafts 61 and 63 have first and second dampers 60 and 62 secured thereto, which dampers may be pivoted towards or away from the second and third pressurized air inlets 54a and 56a as shown in FIG. 4.

In FIG. 6 it will be seen that an arm 65 extends outwardly from one end of the first shaft 61 and by a pin 67 is pivotally connected to a piston rod 69 that is slidably movable in a hydraulic cylinder 71 that is pivotally supported. The pivotal support for the cylinder 71 is illustrated in FIG. 6 as an apertured lug 73 that extends outwardly from an end 75 of the cylinder and by a pin 77 is connected to a fixed mounting 79 that is a part of the boat A. First and second sprockets 81 and 83 are mounted on the first shafts 61 and 63 and connected by an endless chain belt 81a.

A pump 85 is driven by a motor 87, which pump has a suction line 89 extending to a reservoir 91. The discharge from pump 85 is in communication with a multi-port valve 93 that may be positioned by a handle 95 to discharge hydraulic fluid to either of two conduits 97 and 99 that are connected to opposite ends of the hydraulic cylinder 71. When hydraulic fluid is discharged into cylinder 71 through one of the conducts 97 or 99 hydraulic fluid flows back to the valve 93 through the other thereof to be delivered back to the reservoir through a conduit 101.

From the above description it will be seen that by manually manipulating the single handle 95, pressurized hydraulic fluid may be so discharged to cylinder 71 to move first and second dampers 60 and 62 concurrently either towards or away from the second and third air inlets 54a and 56a.

When the first damper 60 is moved towards the second pressurized air inlet 54a the rate of pressurized air flow to the second conduit 54 is decreased as is that to the second bags D. Pressurized air can escape through both the first bag C and second bags D through resilient valves 80 in communication with the interior thereof, with the rate of flow of pressurized air and water that may enter the bags being at a rate less than that at which pressurized air is discharged thereinto. Pressurized air at all times flows from the confined space of valve box E to the third conduit 56, as the first and second dampers will never be moved to positions to completely obstruct the second and third air inlets 54a and 56a.

As the rate of flow of pressurized air from the confined space in valve box E is decreased by movement of the first damper 60, the pressure of air in the confined space 57 as does the rate of flow of pressurized air through first inlet 52a and first conduit 52 to first bag C. This increased rate of pressurized air flow to first bag C increases the pressure therein and bag C expands as a result thereof.

Thus, it will be seen that a single manual control, namely, the valve handle 95, permits the air pressure in the first and second bags C and D to be concurrently varied to provide an inflated configuration of the bags that is particularly adapted for the surface condition of the body of water over which the boat travels. When the first damper 60 is pivoted away from the second air inlet 54a, the pressure within the first bag C is lessened and the pressure in the second bags D increased.

It will be particularly noted that the pressure in the first bag C is varied without the first pressurized air inlet 52a being obstructed in any manner.

An elevator 64 is pivotally supported from the hull B in the rearward portion of the central channel 26, and has a rod 66 pivotally connected that extends to a hydraulic cylinder 68. The hydraulic cylinder 68 is pivotally supported from the transom 20. By pivoting the elevator downwardly rearward flow of pressurized air through the central channel 26 is impeded and additional lift is imparted to the hull B.

Each of the bags C and D has a valve 80 on the rearward portion that discharges water entering the interior of the bag together with pressurized air into the body of water on which the vessel A floats. East valve 80 is commercially available and formed from a resilient tubular body. The valve 80 is known in the trade as a "duck bill" valve, and tends to remain in a closed position until the pressure to which it is exposed exceeds a predetermined valve.

There are three different modes of operating the vessel A. In the first mode when the vessel A is moving at a slow speed, the first and second bags C and D will be deflated, and the vessel will handle in a conventional manner.

At an intermediate speed such as when the vessel A is moving through a rough sea the vessel will be operated at a second mode. The forward bag C will be subjected to air at substantial pressure to provide shock absorption from waves to which the hull B would otherwise be subjected. Air pressure to the second bags D is decreased to increase the draft on vessel A and add stability to its movement.

In the third mode at which the vessel A is operated at high speed air discharge to the central channel is terminated, with air pressure in the second bags D being gradually increased, and the air pressure the first bag C thereafter increased. In the third mode the effective contour of the hull B has been changed due to inflation of the bags C and D to the extent that the vessel A moves forwardly through the water with a minimum of surface contact therewith and with a minimum of hydrodynamic drag. The above described movement is augmented by the discharge of pressurized air to the central channel 26 to impart lift to the hull B.

The use and operation of the invention has been described previously in detail and need not be repeated.

What is claimed is:

1. A water jet propelled boat that has a rigid elongate rectangular shape that is defined by a downwardly and rearwardly curving bow of substantially the width of said hull that merges into a flat bottom, a transom, a pair of side walls that extend below said bottom and outwardly from said bow to define a pair of keel members; a pair of outer and inner laterally spaced parallel sponsons that project downwardly from said bottom and originate rearwardly from said bow and terminate adjacent said transom, with each of said otuer and inner sponsons cooperating to define an outer longitudinal channel therebetween and said inner pair of sponsons defining a central longitudinal channel therebetween, with said boat capable of being operated in a first mode in which the wetted area of said hull is in a configuration substantially defined by the shape of said bow, bottom, pair of sidewalls and said pairs of outer and inner sponsons, and said boat capable of being operated in additional modes in which the configuration of the portion of said hull that is wetted is altered by the operator of said boat relative to the wave condition of the body of water on which the boat is traveling as well as the rate of travel to optimize the effeciency of the operation of said boat, said boat being characterized by:

a. first inflatable bag means secured to said hull to extend downwardly and rearwardly over said bow in a flat configuration when not inflated as occurs when said boat is operated in said first mode;
 b. second inflatable bag means secured to said hull and disposed within said pair of outer channels adjacent said transom that are in a flat configuration when not inflated as occurs when said boat is operated at said first mode;
 c. pressurized air generated means on said boat;
 d. first, second and third air ducts in communication with said first and second inflatable means and at least one opening in said bottom adjacent said bow that communicates with said central channel, with pressurized air discharged into said central channel flowing rearwardly therein as a cushion of air bubble to lessen the friction of said hull with the body of water in which it is moving;
 e. vertically adjustable means adjacent said transom and in longitudinal alignment with said central channel for selectively increasing or decreasing the resistance encountered by sad air bubbles in flowing rearwardly from said central channel to vary the draft of said boat; and
 f. first valve means for varying the rates of flow of pressurized air from said pressurized air generating means to expand said first and second inflatable bag means and alter the contour of the portion of said hull that is wetted by the water on which said boat is traveling, with said altered contour being one that permits said boat to move forwardly through said body of water on which it floats on said bubbles of air with increased fuel effeciency.

2. A water jet propelled boat as defined in claim 1 in which said first valve means includes a single manually operated handle that when moved concurrently varies the rate of flow of said pressurized air delivered to said first and second ducts and first and second inflatable means in a predetermined rate of flow ratio.

3. A water jet propelled boat as defined in claim 1 in which said pressurized air generating means is a power operated blower that has a discharge and said valve means includes:

h. a box that has a pressurized air inlet in communication with said discharge, and first, second and third pressurized air outlets in communication with said first, second and third ducts;
 i. first and second dampers pivotally supported within said box adjacent said second and third outlets; and
 j. movable means operatively associated with said first and second dampers for concurrently pivoting the same, with said first damper when moved towards said second outlet decreasing the rate of flow of said pressurized air therethrough to said second inflatable means to decrease the pressure in the latter and concurrently the pressure of said pressurized air in said box increasing to increase the rate of flow of said pressurized air to said first inflatable means and increase the pressure therein, with the pressures in said first and second inflatable means being reversed when said first damper is pivoted away from said second outlet.

4. A water jet propelled boat as defined in claim 3 in which said movable means is controlled by a single manually operated handle.

5. A water jet propelled boat as defined in claim 1 in which said first inflatable means is a pliable bag that has a pair of side walls situated between said pair of keel members, said pair of keel members restraining outward lateral movement of said pliable bag when the latter is inflated.

6. A water jet propelled boat as defined in claim 5 in which said pair of laterally spaced second inflatable means are a pair of pliable second bags, with each of said second bags when inflated being restrained laterally between a pair of said sponsons.

7. A water jet propelled boat as defined in claim 1 in which said vertically adjustable means is an elevator pivotally supported from said transom in longitudinal alignment with said central channel.

8. A water jet propelled boat as defined in claim 1 in which each of said sponsons has a forward portion that slopes downwardly and rearwardly to impart an upward force to the portion of the hull forwardly therefrom as said boat moves through a body of water.

* * * * *